July 17, 1956

J. C. NEW 2,754,677

NONDESTRUCTIVE TESTING OF THIN SHELLS
BY DIFFERENTIAL PRESSURE

Filed Dec. 23, 1952

INVENTOR
JOHN C. NEW

BY
G. D. O'Brien
R. M. Hicks
ATTORNEYS

INVENTOR
JOHN C. NEW

United States Patent Office 2,754,677
Patented July 17, 1956

2,754,677

NONDESTRUCTIVE TESTING OF THIN SHELLS BY DIFFERENTIAL PRESSURE

John C. New, Riverdale, Md.

Application December 23, 1952, Serial No. 327,706

6 Claims. (Cl. 73—37)

(Granted under Title 35, U. S. Code (1952), sec. 266)

The invention described herein may be manufactured and used by or for the Government of the United States of America for governmental purposes without the payment of any royalties thereon or therefor.

The present invention relates to the non-destructive testing of thin shells by differential pressure. More particularly, the invention relates to a method of nondestructive testing for determining the incipient buckling pressures of thin shells subjected to external pressure, such as those employed in pressure vessels, penstocks, boiler tube, submarine hulls, airplane fuselages, and in underwater ordnance, such as mines and torpedoes.

Prior art devices employ a hydrostatic head under atmospheric pressure, high pressure being applied to either the exterior or interior of the shell or container to be tested with no provision for preventing the sudden collapse or bursting of the shell. Such collapse of the shell occurs with such suddenness that prevention thereof is impossible, and thus the shell being tested is destroyed or rendered unfit for further testing.

By employing the method of the present invention, the shell under test is preserved for further use and the shell is not buckled or collapsed.

The buckling or collapse of a thin shell is an indication of the lack of equilibrium between the external applied pressure and the stress developed in the shell wall. When such a stress is substantially below the elastic limit, such a failure is characterized as being due to elastic instability. When the stress at the time of buckling is in the inelastic range of the material it is characterized as a failure by yielding. In either case, a state of unstable equilibrium exists causing an uncontrolled reaction to take place, namely, a nearly explosive collapse of the shell.

Since the rigidity of the shell is inadequate to maintain equilibrium, an additional force must be introduced to prevent sudden collapse of the shell or to control the rate of collapse thereof. If the aforementioned force is related to the external force through the rigidity of the shell, then at the point of buckling of the shell a balance between the internal and external forces must exist such that for each increase in external load an equal and opposite increase is developed by the restoring or internal force, thus maintaining equilibrium between the forces.

Thus, it is clear that if a closed shell subjected to external pressure is filled with a compressible fluid such, for example, as water, the point at which buckling of the shell begins may be detected by observing the point at which the difference between the external and internal pressures becomes constant. It is also possible in employing the method of the present invention to control to the point where a state of yield exists the extent of shell deformation after buckling has started by regulating the external pressure on the shell. It is, of course, understood that such test operations are accomplished without danger of collapse of the shell.

An object of the present invention is to provide a new and improved method of testing thin shells wherein the collapse of the shells is prevented.

Another object is to provide a new and improved method of testing thin shells wherein the shell is subjected to sufficient pressure to produce incipient buckling and the shell is maintained in a condition to prevent sudden collapse thereof.

Still another object is to provide a novel method of testing thin shells by differential pressure wherein the shells are maintained substantially undamaged by reason of such testing.

A further object of the invention is to provide a novel method of differential pressure testing of thin shells wherein the shell to be tested is filled with a compressible liquid in order to prevent collapse thereof when pressure is applied to the exterior of the shell thus to prevent damage thereto.

A still further object is to provide a novel method of testing thin shells by differential pressure, pressure being applied to the exterior of the liquid-filled shell and wherein internal and external pressures are constantly recorded during the test.

A still further object is to provide a modification of the preferred method of testing thin shells by differential pressure wherein a plurality of steps of pressure increase and decrease is employed to test shells requiring a pressure chamber of high value.

Other objects and many of the attendant advantages of this invention will be readily appreciated as the same becomes better understood by reference to the following detailed description when considered in connection with the accompanying drawing wherein.

Figure 1:
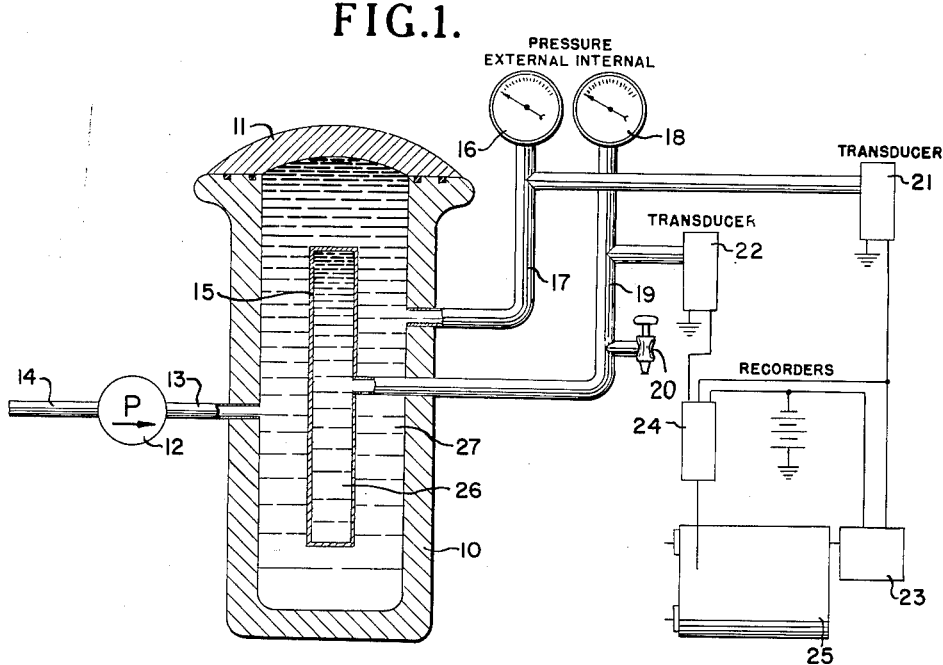
Fig. 1 illustrates in diagrammatic form an apparatus suitable for use with the method of the present invention.

In the following equations, the symbols are defined thus:

$P$ = pressure acting on thin shell
$P_c$ = collapsing pressure for thin shell subjected to external pressure
$P_e$ = external pressure acting on thin shell
$P_i$ = internal pressure acting on thin shell
$P_d = P_e - P_i$, differential pressure acting on thin shell
$D$ = mean diameter of thin shell
$t$ = wall thickness of thin shell
$E$ = modulus of elasticity in compression
$K$ = bulk modulus
$\mu$ = Poisson's ratio
$C$ = a function of elastic constants defined as $E/K(5/4 - \mu)$
$V$ = original internal volume of thin cylindrical shell before application of pressure Units:
  All linear dimensions are in inches
  All pressures, stresses, and elastic moduli are in p. s. i.
  All volumes are in cu. in.
  All constants and ratios are dimensionless In a representative thin cylindrical shell, it has been shown that the volume change in the shell, the material properties, and the external loads are related as follows:

$$\Delta \frac{V}{V} = \frac{P_d D}{Et}(5/4 - \mu) \qquad (1)$$

By definition the bulk modulus of a liquid such as water is $$K = \frac{\Delta P}{\Delta V/V} \qquad (2)$$

For the present case $$\Delta P = P_i = \frac{K \Delta V}{V} \quad (3)$$

and by combining Equations 1 and 3 we obtain $$\frac{P_d}{P_i} = \frac{Et}{KD(5/4-\mu)} \quad (4)$$

For simplicity, C is now defined in terms of elastic constants as $$C = \frac{E}{K(5/4-\mu)} \quad (5)$$

Then $$\frac{P_d}{P_i} = Ct/D \quad (6)$$

Since my definition $$P_d = P_e - P_i \quad (7)$$

we may combine Equations 6 and 7 and obtain finally $$\frac{P_d}{P_e} = \frac{C}{C+D/t} \quad (8)$$

Equations 6 and 8 define the relationship between the differential pressure and the internal or external pressures, respectively. If a Cartesian plot is made of $P_d$ against either $P_i$ or $P_e$, the resulting curve is a straight line having a slope defined by the right-hand member of the equation used.

Figure 2:
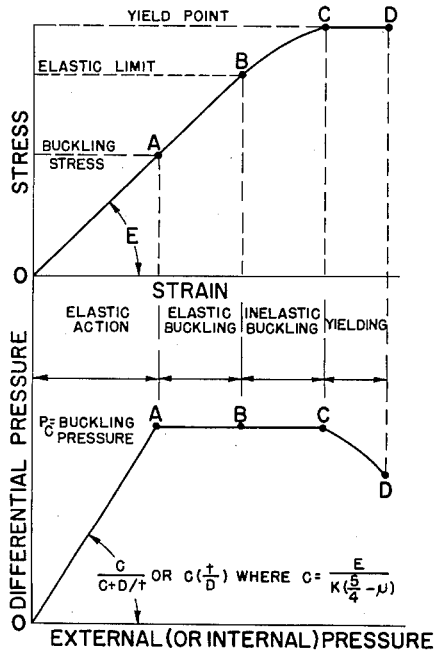
Fig. 2 is a diagram of theoretical pressure and stress-strain curves of the shell.

Fig. 2 illustrates the theoretical pressure curve which the method of the present invention yields and relates the various portions of this curve to the stress-strain curve of the material. In the region O to A the specimen undergoes uniform contraction. At point A the specimen starts to buckle because of elastic instability. As the external pressure is increased, the shell deforms until the internal pressure is increased just sufficiently to regain equilibrium with the external pressure. Thus, if the external pressure is increased 10 p. s. i., the internal pressure increases 10 p. s. i. Consequently, the difference between the external and internal pressures $P_d$ becomes constant and the curve between A and C is horizontal. Although between A and B the differential pressure is constant, the specimen is experiencing a bending strain as the surface warps in addition to the uniform contraction. Thus at point B the specimen deformation is sufficient to have reached the elastic limit of the shell material.

It is significant to note, however, that if the external pressure is released at any point prior to B, the net stress on the shell is the result of the differential pressure and no permanent deformation of the shell will result since the action is entirely within the elastic limits of the shell. Consequently, this procedure, when followed to the aforementioned point, represents a nondestructive method for determining the incipient buckling pressure of the shell. Furthermore, the present method is equally applicable to shells of any geometric configuration and material, or shells having internal ribs, frames, or bulkheads. In such complex structures however, Equations 6 and 8 are not applicable.

When the pressure is increased to pressures between points B and C in Fig. 2, inelastic buckling takes place until point C is reached which represents the yield point of the material of which the shell is composed. As the pressure increases past point C, the shell continues to deform inwardly, provided it is composed of ductile material, even though the external pressure is maintained nearly constant. This deformation or deflection causes a substantial increase in the internal pressure and since the external pressure remains nearly constant, the differential pressure must decrease. If the material is brittle or if the yield point and the ultimate strength are nearly the same, then sudden and uncontrolled failure of the shell will occur in the region of point C.

Referring more particularly to Fig. 1 of the drawings, 10 indicates a pressure chamber having a sealed cover 11. A fluid pump 12, which may be either hand or motor operated, is connected to the chamber 10 by conduit 13. Fluid pump 12 communicates with a fluid reservoir [not shown] by means of conduit 14. A thin shelled casing 15 is mounted in chamber 10 and may be of any desired type such, for example, as those employed for pressure vessels, submarine hulls, airplane fuselages, penstocks, boiler tubes, submerged gasolines, vacuum tanks, and those employed for underwater ordnance, such as mine, depth charge and torpedo cases.

An external pressure gauge 16 is in communication with the chamber 10 through conduit 17, while an internal pressure gauge 18 is in communication with the interior of shell 15 through conduit 19, a valve 20 communicating with conduit 19 for a purpose which will be more clearly apparent as the description proceeds. If desired transducers 21 and 22 may be connected to conduits 17 and 19 respectively, transducers 21 and 22 being of a type to vary the current in a pair of electrical recorders 23 and 24 in response to changes in pressure in conduits 17 and 19 respectively.

In operation, the shell 15 is filled with a compressible fluid such, for example, as water and sealed completely from chamber 10. It is desirable that all air be removed from shell 15 and conduit 19 in order to ensure accuracy of the test.

Recorder 23 is driven by transducer 21 and moves a tape 25 an amount proportional to the external pressure, while recorder 24 is driven by transducers 21 and 22 to provide a recording on tape 25 of the differential pressure, the recorder 24 thus providing a Cartesian plot of the differential pressure with respect to the external pressure.

It is to be understood that the foregoing apparatus is one of a variety of physical arrangements for use with the method of the present invention.

In practicing the method of the present invention the casing having a thin shell 15 is filled with water or other compressible fluid forming an inner volume 26 and the shell 15 is sealed thereafter. Water or other compressible fluid is forced under pressure into chamber 10 by pump 12 from the reservoir (not shown) forming a volume 27 and during which pressures indicated by gauges 16 and 18 are noted. The point of incipient buckling is detected by noting the point at which the difference between the external pressure (indicated by gauge 16) and the internal pressure (indicated by gauge 18) becomes constant. If it is desired to further compress the shell 15 after buckling has started, the deformation of the shell may be controlled by regulating the increase of external pressure (volume 27) acting on the shell until a state of yield exists.

The apparatus described heretofore is employed in the method of the present invention for performing differential pressure tests and comprises in simple form the pressure chamber for enclosing the shell to be tested and the gauges and/or recorder for indicating the pressure differential between the interior and exterior pressures. When manual plotting is employed, the constancy of the differential pressure is readily detected by observing when the difference in the external and internal pressures becomes constant. It has been found that error and much of the labor involved in manual plotting may be substantially reduced by producing by an autographic (X—Y) recorder a Cartesian plot of the pressures as the test proceeds, as heretofore described.

Figure 3:
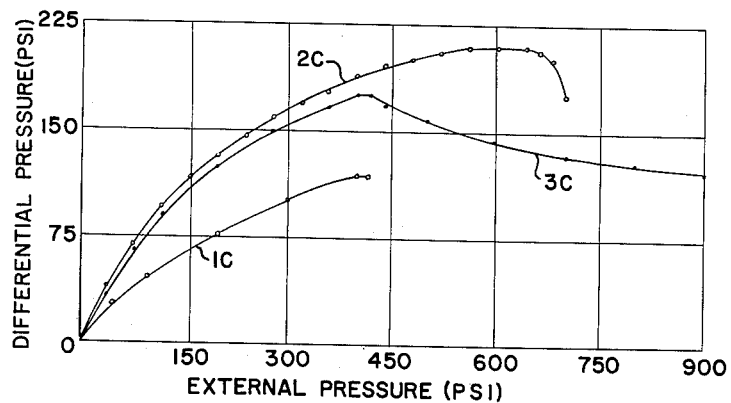
Fig. 3 is a diagram of differential-pressure curves.

In Fig. 3 the curve 1C indicates a typical differential pressure test carried to the point of incipient buckling and stopped at that point without damage to the shell being tested. The curve 2C indicates a typical curve where the differential pressure test is carried on to the point of yielding. Curve 3C indicates a second test of the shell employed in producing curve 2C. It will be noted that buckling starts at a pressure identical with the terminal differential pressure of the test which produced curve 2C.

The following table provides a comparison of results obtained from differential pressure and external pressure tests.

Table I

| Test Specimen | Buckling Pressure, p. s. i. | | Variation, percent |
|---|---|---|---|
| | Differential | External | |
| 1. Stainless Steel [cylinder] | 366 | 400 | +9.3 |
| 2. Aluminum [cylinder] | 209 | 228 | +9.1 |
| 3. Glass Cloth Phenolic [cylinder] | 600 | 575 | −4.2 |
| 4. Mild Steel [cylinder] | 119 | 124 | +4.2 |
| 5. Mild Steel [cylinder] | 571 | 554 | −3.0 |
| 6. Mild Steel [sphere] | 829 | 802 | −3.3 |

In each of the foregoing tests the same specimen was employed for both the differential and the external pressure tests applied thereto in the order named.

The foregoing data were selected to show the results obtained from a wide variety of shell materials and over a wide range of buckling pressures. In the No. 1 and No. 2 tests, the rather high (9.3 and 9.1 per cent) variations between the buckling pressure as determined by the differential test (the differential pressure) and the actual buckling pressure are attributed to premature discontinuance of the differential pressure test. It will be noted that even under such conditions the external collapsing pressure is always within 10 per cent of the differential pressure. It will, also, be noted that in the remainder of the tests the difference between the pressures is within 5 per cent. It is, also, significant that while in each test the same specimen was employed for the differential and the external pressure tests as has heretofore been stated, it is apparent that no measurable damage to the shell was caused during the differential pressure test which, in each case, preceded the external pressure test. In fact, it has been found that applying differential pressure to a fluid-filled thin shell increases the strength of such shells to resist collapse.

It is inherent in the differential pressure test that higher pressures be imposed than when an external pressure test is conducted. This would ordinarily indicate that a pressure chamber having a higher pressure rating would have to be used. In a modification of the method of the present invention the necessity is obviated for the use of such higher rated pressure chamber by employing a step procedure in building up the external pressure. This method is illustrated in Fig. 4 of the drawings wherein solid lines indicate an increasing pressure while dotted lines denote a decreasing pressure.

The step method comprises building up the external pressures until the maximum pressure of the pressure chamber is reached and noting the differential pressure. The external pressure is released to a value slightly greater than the terminal differential pressure. The internal pressure is now released to nearly zero by carefully cracking the valve 20, leaving a net differential of that first achieved at maximum external pressure. The foregoing constitutes a step in the modification of the present method and may be repeated as many times as is necessary to generate the required differential pressure.

It is essential in releasing the internal pressure that the terminal differential pressure of the preceding step not be exceeded in order to prevent sudden collapse of the shell.

Figure 4:
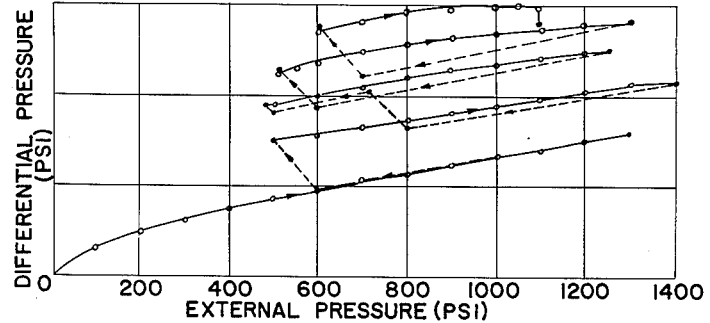
Fig. 4 is a diagram of differential-pressure curves produced under a slight modification of the method of the present invention.
Figure 5:
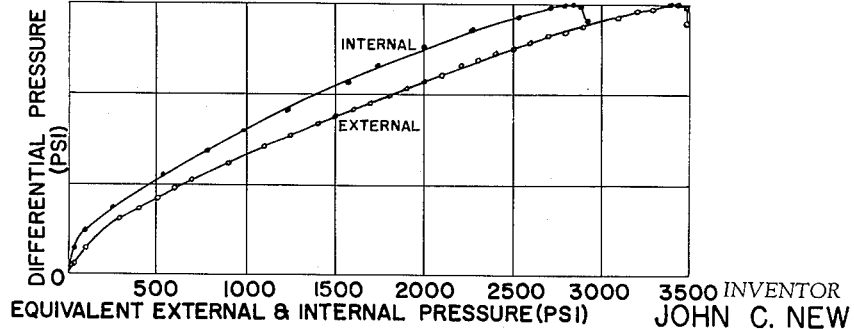
Fig. 5 is a composite diagram showing the pressure curves of Fig. 4.

As shown in Fig. 5, a continuous smooth curve results from replotting the data of Fig. 4 omitting the overlap areas. It is to be noted that had the step method not been used, a pressure chamber of more than double the rating would have been necessary to perform the foregoing test.

The property of compressibility of water is known and has been set forth authoritatively in literature such, for example, as a book entitled "Hydraulics" by Horace M. King, Chester, O. Weisler and James G. Woodburn, fourth edition, New York, published by John Wiley and Son, Inc., London; Chapman and Hall, Limited, 1941, page 9, paragraph entitled, "Compressibility," the first three sentences of which are quoted herewith; "Water is commonly assumed to be incompressible, but in reality it is slightly compressible. Upon release from pressure, water immediately regains its original volume. For ordinary pressures the modulus of elasticity is constant, that is, the amount of compression is directly proportional to the pressure applied."

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The method of nondestructive testing of thin-walled shells by differential pressure and comprising the steps of applying continually increasing pressure to the exterior of a sealed liquid-filled shell, repeatedly comparing the exterior pressure simultaneously with the interior pressure of the shell until the pressure differential therebetween becomes constant, and terminating the increase in said exterior pressure when said pressure differential becomes constant thereby to determine the point of incipient buckling of the shell.

2. The method of nondestructive testing of a thin-walled shell by differential pressure and comprising the steps of completely filling the interior of the shell with a liquid, sealing said shell, applying pressure to the exterior of the shell, increasing gradually the pressure applied to the exterior of the shell, comparing the interior and exterior pressures during said gradual increase in pressure, and terminating said increase in exterior pressure when the pressure differential between the exterior and interior pressures becomes constant whereby the point of incipient buckling of the shell is determined.

3. The method of nondestructive differential pressure testing of a thin-walled shell comprising the steps of filling the interior of the shell with a compressible liquid, applying pressure to the exterior of the shell, increasing gradually the exterior pressure, comparing the pressure of the interior liquid with the exterior pressure as the exterior pressure is increased, and terminating the increase in exterior pressure when the pressure differential between the exterior and interior of the shell becomes constant whereby the point of incipient buckling of the shell is determined.

4. The method of nondestructive high-pressure testing of a thin-walled shell by differential pressure in a pressure chamber and comprising the steps of completely filling the interior of the shell with a liquid, sealing the shell, placing the shell in said chamber, filling the chamber with liquid, increasing the pressure of the liquid in said chamber to the maximum pressure rating of the chamber, releasing the pressure of the liquid in said chamber to a value slightly greater than the pressure differential between said chamber and said shell when the liquid in the chamber is at said maximum pressure, reducing the pressure in the shell to approximately zero thereby to leave a net differential equal to the pressure differential corresponding to said maximum external pressure, and repeating the foregoing pressure increasing and decreasing steps in the order named until the desired pressure differential is attained.

5. The method of nondestructive testing of thin-walled shells by differential pressure and comprising the steps of applying increasing pressure to the exterior of a sealed fluid-filled shell, repeatedly comparing the exterior pressure simultaneously with the interior pressure of the shell, and terminating the increase in said exterior pressure when the exterior and interior pressure differential become constant during an increase of said exterior pressure thereby to condition said shell to increase the resistance thereof to collapse.

6. The method of nondestructive testing of thin-walled shells comprising the step of applying liquid pressure to the exterior of a sealed liquid-filled shell, increasing the exterior pressure by increments, measuring the exterior pressure at each incremental increase, simultaneously measuring the pressure interiorly of the shell, and maintaining the exterior pressure constant at the value at which the pressure differential remains constant during said increase of exterior pressure.

References Cited in the file of this patent

UNITED STATES PATENTS

| | | |
|---|---|---|
| 1,222,817 | Sobraske | Apr. 17, 1917 |
| 2,041,028 | Stanley | May 19, 1936 |

FOREIGN PATENTS

| | | |
|---|---|---|
| 415,352 | France | Sept. 24, 1910 |
| 124,770 | Sweden | Apr. 26, 1949 |